United States Patent [19]

Cohen et al.

[11] 4,455,161

[45] Jun. 19, 1984

[54] TRACE ELEMENT FERTILIZER COMPOSITION

[75] Inventors: Michael A. Cohen, Bexley; Luther A. Eirich, Raymond, both of Ohio

[73] Assignee: The O.M. Scott & Sons Company, Marysville, Ohio

[21] Appl. No.: 417,528

[22] Filed: Sep. 13, 1982

[51] Int. Cl.³ .............................................. C05F 11/02
[52] U.S. Cl. ........................................ 71/24; 71/60; 71/63
[58] Field of Search .................... 71/63, 24, 23, 58, 60

[56] References Cited

U.S. PATENT DOCUMENTS

| | | | |
|---|---|---|---|
| 3,244,505 | 4/1966 | Adolphson et al. | 71/25 |
| 3,660,068 | 5/1972 | Wilson | 71/34 |
| 3,692,529 | 9/1972 | Rychman | 71/904 |
| 3,820,970 | 6/1974 | Watkins | 71/53 |
| 4,015,972 | 4/1977 | Watkins et al. | 71/31 |
| 4,127,964 | 12/1978 | Mee | 71/24 |
| 4,127,965 | 12/1978 | Mee | 71/63 |
| 4,328,025 | 5/1982 | Whitcomb | 71/23 |
| 4,334,906 | 6/1982 | Young | 71/33 |

*Primary Examiner*—Delbert E. Gantz
*Assistant Examiner*—A. Pal
*Attorney, Agent, or Firm*—James B. Raden; Harold J. Holt

[57] ABSTRACT

A slow release particulate fertilizer comprising a carrier containing trace elements distributed homogeneously therein. The trace elements include salts or oxides of iron, manganese, zinc and copper in certain critical proportions. The carrier contains significant proportions of calcium and sulfur and is preferably gypsum. The composition is particularly suitable for use with soilless potting media for container grown ornamentals.

5 Claims, No Drawings

TRACE ELEMENT FERTILIZER COMPOSITION

This invention relates to a trace element fertilizer composition in particulate form and particularly to such a fertilizer composition for use with soilless plant media.

The primary type of artificial or soilless potting media now in use for the commercial production of container grown ornamentals consists of a combination of such components as bark (fir, hemlock or pine), peat, sand, shale and perlite. Although these media provide freedom from insects, partial freedom from disease and improved porosity and bulk density, they are generally deficient and sometimes even devoid of one or more of the essential trace elements. Trace elements as used herein includes at least iron, manganese, zinc, copper and molybdenum and in some instances boron. There are several major techniques by which commercial growers supply the needed trace elements to artificial media. The nursery industry most frequently applies such trace elements as a fritted composition. In such fritted compositions, a group of minor elements are fused with glass, the glass is shattered and the resultant product is applied to the media. Disadvantages of such fritted compositions include variability in release rate (causing imbalances in providing nutrient requirements to plant), lack of homogeneity causing poor nutrient distribution and unavailability for immediate plant-root uptake.

Another form of trace element nutrients utilized by commercial growers is as metal chelates. Chelates are cyclic structures of a metal atom and an organic component in which the two components are held together with varying degrees of bond strength. Major disadvantages of such chelates are that some chelate metals are only active under alkaline pH while others only under acidic pH conditions, certain chelates (Mn and Zn) are ineffective when soil applied due to insolubility complexes, stability of the metal chelates varies with the specific metal, some trace elements (Mo and B) do not form chelates and chelates cannot be mixed with liquid fertilizers containing ammonia.

Gypsum, a hydrated form of calcium sulfate, is a known soil conditioning agent. U.S. Pat. Nos. 3,820,970 and 4,015,972 both disclose the use of compacted gypsum as a soil conditioner which may optionally contain either macronutrient and micronutrient fertilizer ingredients. Other references which disclose the use of calcium sulfate or gypsum as a soil additive either alone or in combination with other ingredients are U.S. Pat. Nos. 3,660,068; 3,692,529; 4,127,964; and 4,127,965. U.S. Pat. No. 4,334,906 discloses the use of highly porous sulfur, containing micronutrients dispersed therein as soil additives. However none of these references specifically address the problem of providing plant nutrients to container grown ornamentals and particularly those using so-called soilless media.

A major object of the present invention is the provision of a trace element fertilizer composition for use with container grown ornamentals which provides effective and uniform levels of trace elements in an amount necessary to maximize plant growth over an extended period of time.

It is an additional object of this invention to provide a trace element fertilizer composition having uniform particle and density characteristics which provides equal response when incorporated into or applied to the surface of plant media, particularly soilless plant media.

The foregoing and other objects of the invention are achieved in a slow release particulate fertilizer composition for use with plant media comprising a carrier containing trace elements distributed homogeneously therein. Each of the particles of the composition comprises a compacted mixture of one part by weight of plant nutrient trace elements and from two to five parts by weight of the carrier, the nutrient trace elements being metallic compounds in the form of salts or oxides which provide for the slow release to the media of the metals iron, manganese, zinc and copper, the metals being present in an amount of from 2.5 to 5.5% of iron and from 1.3 to 2.7% each of manganese, zinc and copper, the ratio of iron to manganese being at least two to one, the percentages being the percent by weight of the metallic trace element in said compounds based upon the total weight of the composition. The particular carrier comprises significant proportions of calcium and sulfur, the sulfur being present in the form of a sulfate.

The composition of the invention provides slow release trace elements in a given range of amounts that improves plant quality and plant growth and enhances nutrient uptake in a soilless media. The particulate composition has physical characteristics which allow for uniform distribution of trace elements to the plant media when either incorporated into or surface applied to the media.

The proportions of trace elements and of the carrier, the presence of a calcium-sulfur carrier and the granular or particulate nature of the composition are all critical and together provide the high level of agronomic response of the present products. The calcium-sulfur component of the carrier acts not only in its carrier function to aid dispersion of the micronutrients but also provides required calcium and sulfur nutrients. Calcium and sulfur are important to a number of plant functions including formation of cell wall membranes and of lipid and protein structures such as sulfur bearing amino acids—cystine, cysteine and methionine and sulfur bearing vitamins—thiamine and coenzyme A. In its preferred form, the carrier is hydrous calcium sulfate or gypsum.

If the trace element nutrients are used in amounts or ratios outside of those here set forth, equivalent plant response will not be obtained. Further, fritted compositions containing the same trace elements in the same ratios and amounts and with the same carrier will not produce equivalent plant response.

The composition contains at least the four trace elements iron, manganese, zinc and copper. It may optionally contain other trace elements such as, for example, molybdenum. If molybdenum is present, it should be in amounts by weight of 0.01 to 0.03%. In addition to the stated ranges of amounts of the trace elements iron, manganese, zinc and copper, it is preferable that the trace elements be present in a ratio by weight of from 2:1:1:1 to 4:2:2:2 to 4:1:1:1. The most critical ratio of trace elements is the ratio of iron to manganese which should be at least two to one and preferably from 2:1 to 4:1. Best results have been achieved with a ratio of 2:1 of iron to manganese. At ratios of 5:1, the plant overloads on iron at the expense of manganese resulting in a reduction in plant growth and typically demonstrating manganese deficiency. The trace elements should preferably be present in the form of their sulfates or oxides and specifically as ferrous, manganese and zinc sulfate and cuprous oxide. If molybdenum is present, it should be present as molybdenum sulfate.

The compositions of the invention are prepared by mixing appropriate proportions of gypsum and the minor element oxide and sulfate powders. The mixture is then compacted under high pressure, typically ranging from 1000 to 2000 lbs. per linear inch of compaction width, to form a sheet of physically bonded product. The sheet is then comminuted for particle size reduction and screened to produce a particulate or granular product—typically from 3½ to 20 mesh.

As previously indicated, artificial or soilless media used for the commercial production of container grown ornamental plants generally comprise a mixture of such components as bark, peat, sand, shale and perlite. Media containing two or more of such components are useful in the practice of the invention. A preferred soilless media for use with the fertilizer compositions of the invention is a mixture of composted or naturally aged southern pine bark, sand and Canadian sphagnum peat moss.

The fertilizer compositions should be applied to the soilless media in amounts ranging from 4 to 32 ounces per cubic yard. Usually this amount will range from 8 to 16 oz/yd$^3$ but the amount will vary depending on the plants being treated, frequency of fertilizer application and whether it is mixed with the media or applied to the surface.

The following examples are illustrative of the practice of the invention. Unless otherwise indicated, all parts are by weight. The percentage of the trace element package is expressed as % of metallic element.

EXAMPLE 1

A particulate fertilizer composition was prepared and compacted into a granular material as follows. A package of trace elements was prepared from the following proportions of the following ingredients:

FeSO$_4$: 2.72%
MnSO$_4$: 1.36%
ZnSO$_4$: 1.36%
CuO: 1.36%

One half pound of this trace element package was premixed in a blender with 2.5 pounds of gypsum (CaSO$_4$·7 H$_2$O). This mixture was fed to a compactor consisting of two counter-rotating corrugated rolls separated by a small gap on the order of 20 to 60 thousands of an inch. One of the rolls was hydraulically loaded so as to apply pressure against the other roll, which was held on a stationary axis. The mixture of the trace elements and gypsum was compacted as it passed between the rolls under high pressures of from 1200 to 1600 pounds per linear inch of roll up to form a sheet of physically bonded gypsum and trace elements. This sheet was then fed to a comminuting machine for particle size reduction where it was milled at 1000 rpm using a 1.156 inch product screen. The milled material was screened through 6 and 14 mesh screens and was ready for use at this point.

EXAMPLE 2

Two genera of ornamentals (*Photinia fraseria* and Rhododendron) were planted in 1 gallon containers containing a soilless media consisting of pine bark, sand, and peat in a ratio of 3:1:1 by volume respectively. Particle size was ¼ to ⅜ inch. To each media mix, surface applications of the trace element composition of Example 1 were made with each treatment replicated 4 times with 6 plants/subplot. The proportions of the trace elements and the rate of application were varied over a total of four different samples. All plants received the same level of nitrogen, phosphorus, and potassium—20 lbs. of nitrogen/1000 sq. ft. (N/M). Plants were evaluated after 4 months to determine influence of the different ratios of the same trace element composition on plant quality. The effect of the ratio of trace elements in the composition can be seen in Table I in which the ratios are of Fe:Mn:Zn:Cu. The quality ratings in Table I, and in the tables which follow, are a visual rating of color, height, and size as measured against a commercial standard on a basis of 1 to 10 with 10 being the highest quality.

TABLE I

| Sample | Ratio | Rate (oz/yd$^3$) | Plant Quality Photinia | Plant Quality Rhododendron |
|---|---|---|---|---|
| 1 | 2:1:1:1 | 8 | 9.7 | 8.5 |
| 2 | 5:1:1:1 | 8 | 8.8 | 6.9 |
| 3 | 2:1:1:1 | 16 | 8.7 | 8.0 |
| 4 | 5:1:1:1 | 16 | 7.0 | 7.1 |
| 5 | 2:1:1:1 | 32 | 7.3 | — |
| 6 | 5:1:1:1 | 32 | 6.5 | — |

EXAMPLE 3

Liners of Photinia fraseri and Rhododendron were planted in 1 gallon containers containing a soilless media. To each soilless media mix, the trace element composition of Example I was added containing different ratios of trace elements with gypsum. All treatments were incorporated at the time of planting. Plants all received the same level of nitrogen, phosphorus and potassium—20 lbs. N/M every ten weeks. Treatments were replicated four times with six plants/subplot. Plants were grown under normal irrigation practices and cultural conditions. Plants were evaluated after four months for plant quality. Results are set forth in Table II.

TABLE II

| Sample | Ratio | Rate (oz/yd$^3$) | Plant Quality Photinia | Plant Quality Rhododendron |
|---|---|---|---|---|
| 1 | 2:1:1:1 | 16 | 9.0 | — |
| 2 | 3:2:2:1 | 16 | 7.0 | — |
| 3 | 5:1:1:1 | 16 | 8.0 | — |
| 4 | check | | 6.0 | — |
| 5 | 2:1:1:1 | 8 | — | 8.5 |
| 6 | 3:2:2:1 | 8 | — | 7.5 |
| 7 | 5:1:1:1 | 8 | — | 6.8 |
| 8 | check | | | 6.3 |

Tables I and II show the importance of the ratio of trace elements to each other. Plant performance was enhanced with a ratio of 2:1 (iron:manganese) as compared to ratios of 5:1 or 3:2, all at equivalent rates of application. The data also demonstrated that 8 to 16 oz/yd$^3$ gave better results than higher application rates.

EXAMPLE 4

Two genera of ornamentals were grown in 1 gallon containers and planted in a soilless media (bark, peat and sand). To each group of plants either a fritted composition or the composition of Example I was incorporated at potting. The fritted composition contained a 2:1:1:1 ratio of iron, manganese, zinc and copper plus gypsum. Plants either received 8 oz/yd$^3$ or 16 oz/yd$^3$ of trace elements with gypsum. All plants received the same level of nitrogen, phosphorus and potassium fertilizer (20 lbs. N/M every week). Treatments were replicated 4 times with 4 plants/subplot. Plants were grown for 4 months under normal irrigation practice and cultural conditions. Plants were evaluated at 4 months after application and determination of plant quality was determined. The results are shown in Table III.

TABLE III

| Sample | Ratio | (oz/yd³) | Plant Quality Rhododendron | |
|---|---|---|---|---|
| | | | Herbert | Rosebud |
| 1. Invention | 2:1:1:1 | 8 | 10 | 10 |
| 2. Fritted | 2:1:1:1 | 8 | 9 | 9 |
| 3. Invention | 2:1:1:1 | 16 | 10 | 9 |
| 4. Fritted | 2:1:1:1 | 16 | 8 | 8 |
| 5. Check | — | — | 4 | 3 |

EXAMPLE 5

Example 4 was repeated with two additional genera of ornamentals but at a rate of 4 oz/yd³ in order to afford additional comparative results. In this example, the fritted composition contained the same level of gypsum as that of the invention in Example I. Results are shown in Table IV. The ratio of trace elements in both cases was 2:1:1:1.

TABLE IV

| | Sample | Plant Quality | |
|---|---|---|---|
| | | Ilex | Pieris |
| 1. | Invention | 9 | 8 |
| 2. | Fritted | 8 | 6 |
| 3 | Check | 7 | 5 |

EXAMPLE 6

Two separate studies were initiated with two species (Rhododendron "Rosebud" and "Herbert") to determine the influence of different trace element packages, along with the differences in effects of rate. The plants were again treated with the same rates of the composition of Example I and a fritted composition containing the same proportions of the same trace elements and gypsum. Two species were planted in soilless media (pine bark, sand, and peat) and treated with the same level of nitrogen, phosphorus, and potassium (20 lbs. N/M). Plant treatments were replicated 4 times with each treatment containing four plants/subplot. Plants were evaluated after 4 months for plant quality/fresh weight of plant tissue. Results are shown in Table V.

TABLE V

| | | | Plant Quality | |
|---|---|---|---|---|
| | Sample | Rate (oz/yd³) | Rhododendron "Rosebud" | Rhododendron "Herbert" |
| 1. | Invention | 4 | 7.7 | 9.3 |
| 2. | Fritted | 4 | 7.0 | 7.6 |
| 3. | Invention | 16 | 8.7 | 9.7 |
| 4. | Fritted | 16 | 7.0 | 7.0 |
| 5. | Check | — | 3.3 | 4.0 |

Tables III, IV and V show that the plants displayed a difference in their affinity of absorption of trace elements as oxides or sulfates vs fritted form even when the same carrier and same application rates were used. The difference in absorption resulted in a better quality ornamental plant in all three tables. The difference was further accentuated in Table V at the higher application rate.

EXAMPLE 7

Liners of Crapemyrtle were planted in 1 gallon containers in a soilless media. To each group of plants, rates of 4, 8 or 16 oz/yd³ of the composition of Example I were incorporated at potting. The control group received fritted minors at 4 oz/yd³ having the same trace element composition of Example I. All plants received the same level of nitrogen, phosphorus and potassium (20 lbs. N/M every 8 weeks). Plants were replicated 4 times with 6 plants/subplot. Plant growth was harvested 6 months after initial application. Results are shown in Table VI.

TABLE VI

| Sample | Rate (oz/yd) | Fresh Weight (gm) Crapemyrtle |
|---|---|---|
| 1. Fritted | 4 | 319 |
| 2. Invention | 4 | 359 |
| 3. Invention | 8 | 368 |
| 4. Invention | 16 | 443 |

EXAMPLE 8

Liners of Euonymus "Silver King" were potted in a soilless media and trace elements were incorporated. All plants received the same nitroen, phosphorus, and potassium (20 lbs. N/M every 12 weeks). Test were replicated 3 times with 50 plants/subplot. Plants were evaluated after 6 months for tissue content. Results are shown in Table VII.

TABLE VII

| | | Tissue Analysis Euonymus "Silver King" | | | | |
|---|---|---|---|---|---|---|
| | | % | | | ppm | |
| | Sample | N | P | K | Cu | Zn |
| 1. | Invention | 4.9 | .7 | 2.3 | 24 | 69 |
| 2. | Fritted | 4.6 | .6 | 2.0 | 7 | 49 |

Tables VI and VII show that at equivalent rates, the composition of the invention increased growth 18% more than the equivalent composition in fritted form. As demonstrated by Table VII, this increase in growth appears to result from more efficient metabolizing of the compositions of the invention resulting in a higher percent of nutrients, including nitrogen and potassium, within the plant tissues than fritted trace elements applied in the same ratios and amounts.

EXAMPLE 9

Three genera of ornamentals were grown in one gallon containers and planted in a soilless media consisting of southern pine bark, sand and premier sphagnum peat moss. The peat had been screened through a screen having a maximum opening of ½ inch. To each group of plants, the composition of Example I was applied at the rate of 8 oz/yd³ both with and without the addition of gypsum. The type, amount and proportion of trace elements remained the same. All plants received the same level of nitrogen, phosphorus, and potassium (20 lbs. N/M every 8 weeks). Plant treatments were replicated 4 times with 9 plants/subplot. Plannts were grown under normal irrigation practices and cultural conditions. Plants were evaluated after 6 months for plant quality and tissue analysis. Results are shown in Table VIII.

TABLE VIII

| Sample | Plant Quality | | |
| --- | --- | --- | --- |
| | Nandina | Abelia | Rhododendron |
| 1. w/gypsum | 8.9 | 8.5 | 8.6 |
| 2. w/o gypsum | 6.2 | 5.6 | 7.0 |
| 3. Check | 2.5 | 2.6 | 4.0 |

Table IX is a tissue analysis of Samples 1 and 2 of Example 9 for Nandina (Nandina domestica).

TABLE IX

| Sample | Tissue Analysis of Nandina | | | | | | | | |
| --- | --- | --- | --- | --- | --- | --- | --- | --- | --- |
| | N | P | K | Ca | Mg | Fe | Mn | Cu | Zn |
| 1. w/gypsum | 2.74 | .40 | 1.31 | .73 | .12 | 28 | 55 | 21 | 42 |
| 2. w/o gypsum | 2.42 | .35 | 1.01 | .30 | .12 | 24 | 38 | 10 | 34 |

Tables VIII and IX indicate the importance of the gypsum carrier. The results suggest that improved plant performance, and improved nutrient uptake occur when gypsum is utilized with the same level and type of trace elements.

EXAMPLE 10

Two genera of ornamentals were grown in 1 gallon containers and planted in a soilless media. To each group of plants, an incorporated mixed or surface application of the composition of Example I with and without gypsum was applied at potting. The type, amount and proportion of trace elements remained the same. All plants received the same level of nitrogen, phosphorus, and potassium, (20 lbs. N/M every 8 weeks). Plant treatments were replicated 3 times with 6 plants/sub-plot. Plants were grown under normal irrigation practices and cultural conditions. Plants were evaluated for (1) influence with and without gypsum and (2) influence on placement of trace elements. Fresh weight of foliage was removed after 6 months and weighed. Results are shown in Table X.

TABLE X

| Sample | Rate (oz/yd$^3$) (or gm/ 6" pot) | Method of Application | Fresh Weight (gm) | |
| --- | --- | --- | --- | --- |
| | | | Nandina Domestica | Gardenia Radicans |
| 1. w/gypsum | 8 | Incorporation | 325 | 390 |
| 2. w/o gypsum | 8 | Incorporation | 257 | 367 |
| 3. w/gypsum | 5.7 | Surface | 343 | 355 |
| 4. w/o gypsum | 1.3 | Surface | 297 | 264 |

EXAMPLE 11

This example was a repetition of Example 3 but with different plant species. The trace element compositions were applied in both cases to the surface. Results are shown in Table XI.

TABLE XI

| Sample | Rate (gm/6" pot) | Ilex "Compacta" | Plant Quality Rhodendron | |
| --- | --- | --- | --- | --- |
| | | | "Rosebud" | "Herbert" |
| 1. w/gypsum | 5.7 | 9.0 | 9.1 | 8.3 |
| 2. w/o gyspum | 1.3 | 7.8 | 7.0 | 7.1 |
| 3. check | — | 7.5 | 4.5 | 3.5 |

EXAMPLE 12

Three genera of ornamentals were grown in 1 gallon containers using a soilless media (pine bark, sand, and peat). To each volume of mix, the following treatments were assigned: (1) The composition of Example I or, (2) the same composition in the same amount less gypsum. All treatments received the same level of nitrogen, phosphorus and potassium every 8 weeks (20 lbs. N/M). Treatments werre replicated 4 times with 4 plants/subplot. Plants were grown under normal irrigation practices and cultural conditions. Plants after 6 months were rated for plant quality and uniformity of growth. Results are shown in Table XII.

TABLE XII

| Sample | Rate (oz/yd$^3$) | Plant Quality | | |
| --- | --- | --- | --- | --- |
| | | Pittosporum | Podocarpus | Buxus |
| 1. w/gypsum | 8 | 8.3 | 9.0 | 9.6 |
| 2. w/o gypsum | 8 | 7.1 | 8.2 | 8.2 |

The data from Tables X–XII again confirm the importance of the use of gypsum as a carrier in the fertilizer compositions of the invention. This data also demonstrates the effectiveness of the compositions applied either to the surface of, or incorporated into the soilless media.

It is apparent from the above that the invention provides a highly efficient fertilizer composition, particularly useful for soilless plant media, containing a critical proportion of certain trace elements plus calcium and sulfur. The composition is in a form which provides an enhanced level of homogeneity and dispersibility with resulting improved nutrient uptake as compared with the most closely analogous products of the prior art.

We claim:

1. A slow release particulate trace element fertilizer composition in granular form comprising a homogeneous mixture of trace elements and calcium sulfate,
   each of the particles of said composition comprising a granular mixture of one part by weight of plant nutrient trace elements and from two to five parts by weight of calcium sulfate,
   said nutrient trace elements being metallic compounds in the form of salts or oxides which provide for the slow release to the media of the metals iron, manganese, zinc and copper, said metals being present in an amount of from 2.5 to 5.5% of iron and from 1.3 to 2.7% each of manganese, zinc and copper, the ratio of iron to manganese being from two to one to four to one, said percentages being the percent by weight of the metallic trace element in said compounds based upon the total weight of the composition,
   said particulate carrier comprising calcium sulfate.

2. The composition of claim 1 in which the trace elements iron, manganese, zinc and copper are present in a ratio byweight of 2:1:1:1.

3. The composition of claim 1 in which a salt or oxide of the trace element molybdenum is also present in an amount by weight of from 0.01 to 0.03%.

4. The composition of claim 1 in which the carrier is gypsum.

5. The composition of claim 1 in which each particle comprises one part by weight of plant nutrient trace elements and about five parts by weight of said carrier.

* * * * *